April 28, 1953 M. J. NAPIER 2,636,284
HANDLING OF MATERIALS AND APPARATUS THEREFOR
Filed July 12, 1948 5 Sheets-Sheet 1
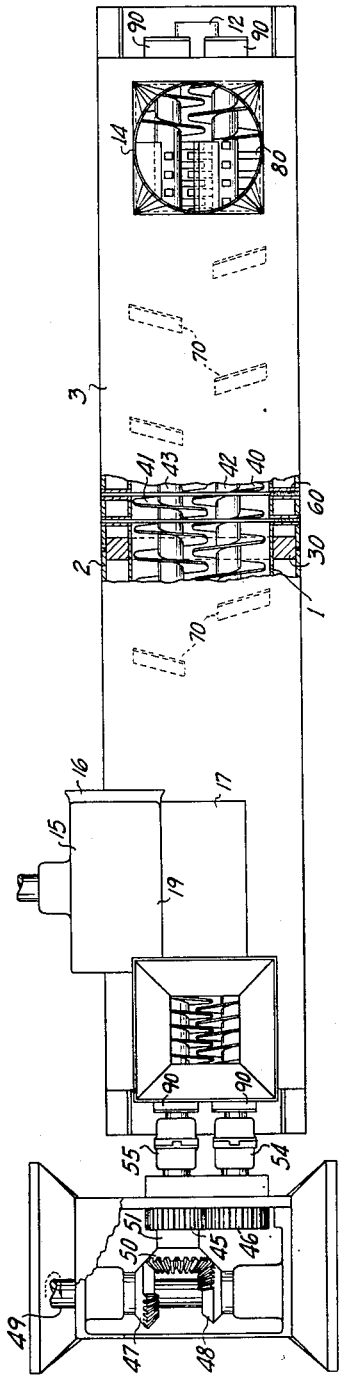
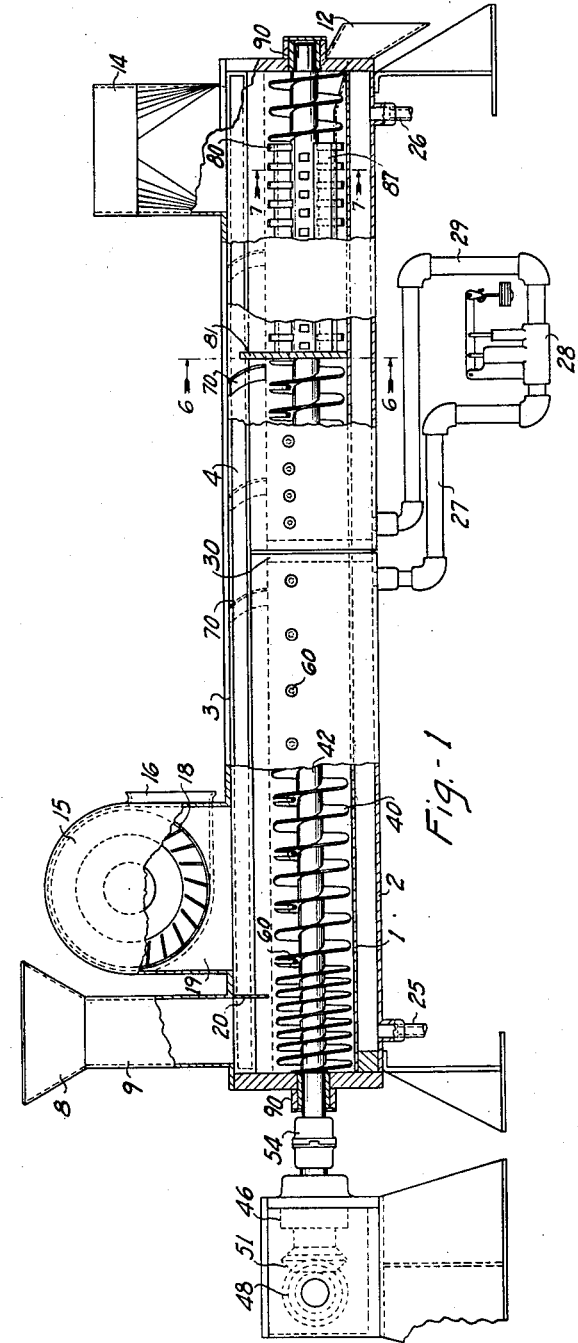
INVENTOR.
MELVIN J. NAPIER
BY
Gordon C. Mack
attorney

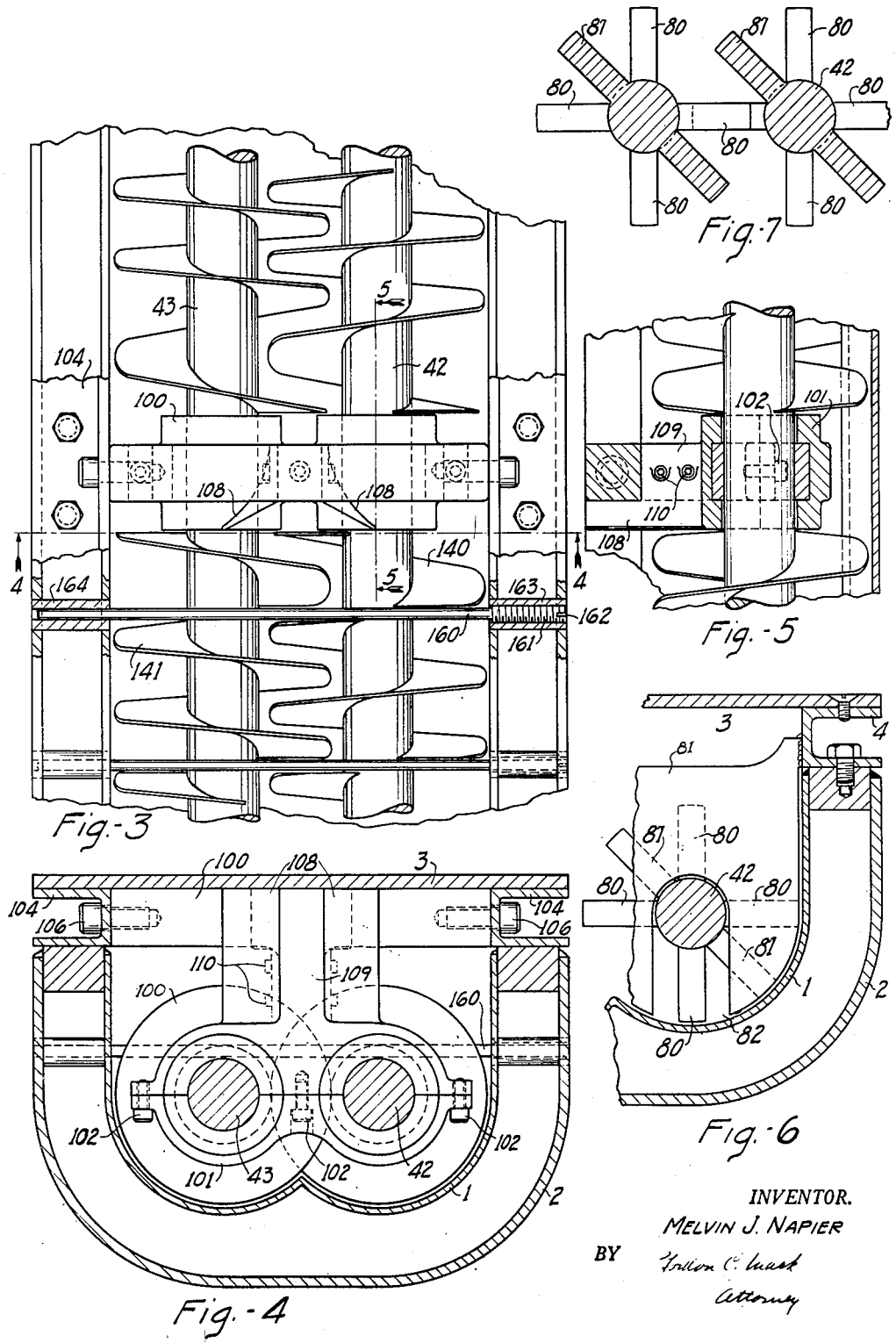

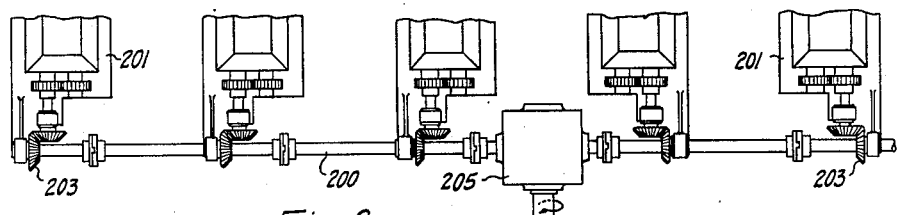
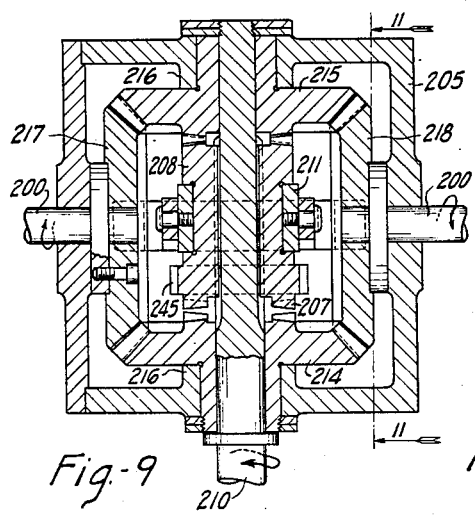
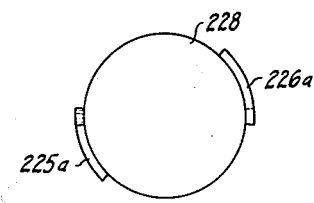
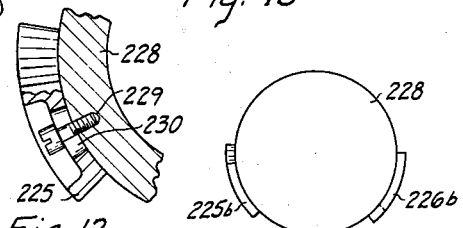
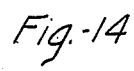
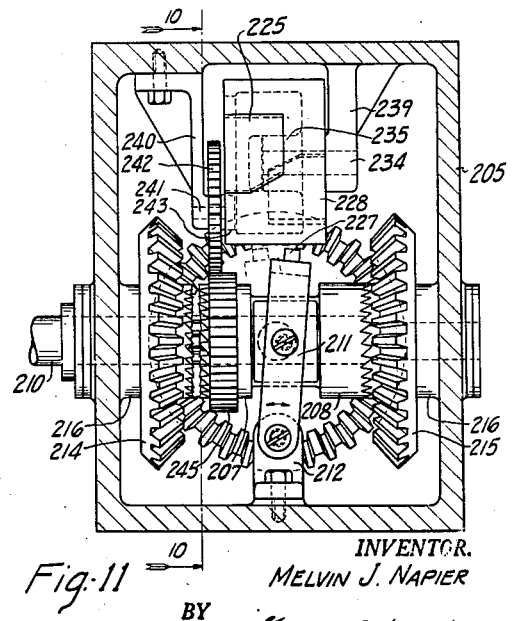

April 28, 1953  M. J. NAPIER  2,636,284
HANDLING OF MATERIALS AND APPARATUS THEREFOR
Filed July 12, 1948  5 Sheets-Sheet 4

INVENTOR.
MELVIN J. NAPIER
BY
Gordon C. Luack

April 28, 1953   M. J. NAPIER   2,636,284
HANDLING OF MATERIALS AND APPARATUS THEREFOR
Filed July 12, 1948   5 Sheets-Sheet 5
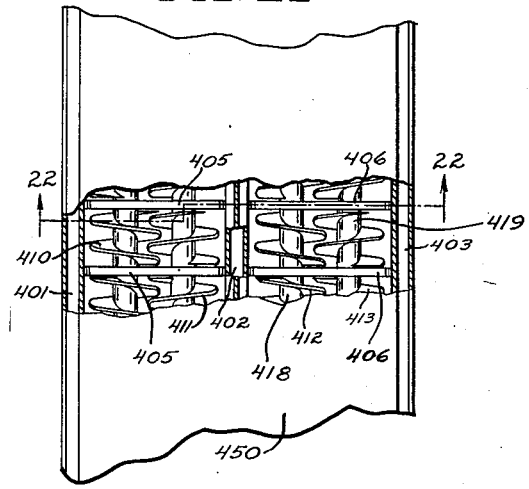
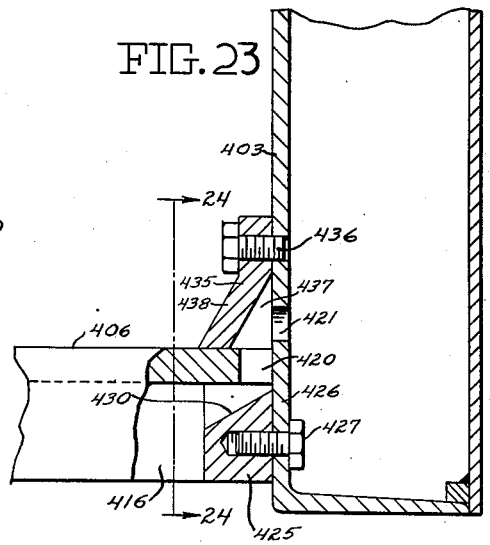
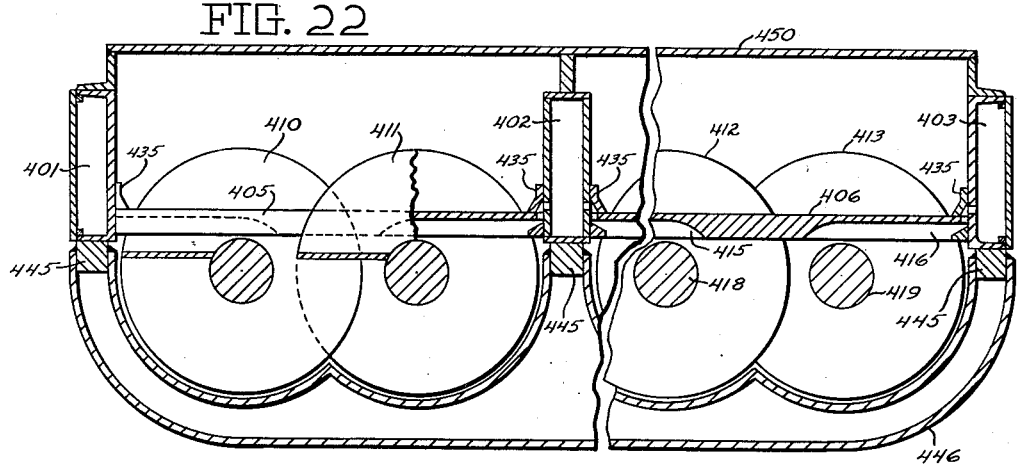
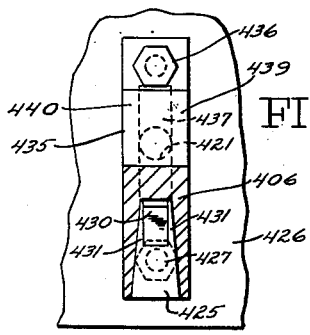
INVENTOR.
MELVIN J. NAPIER
BY Gordon C. Mack
Attorney Patented Apr. 28, 1953

2,636,284

UNITED STATES PATENT OFFICE 2,636,284

HANDLING OF MATERIALS AND APPARATUS THEREFOR

Melvin J. Napier, Akron, Ohio, assignor to Miami Boiler & Machine Company, Inc., Akron, Ohio, a corporation of Ohio Application July 12, 1948, Serial No. 38,264

11 Claims. (Cl. 34—182)

1

This invention relates to the handling of materials, and, more particularly, to the drying and/or cooking thereof. It includes the process and apparatus for carrying it out. The apparatus is particularly adapted for the treatment of pasty or pulpy materials, including glue-like fibrous substances and includes the process for the treatment thereof and especially for the drying of brewery spent grains, distillery slops and the cooking and drying of fish products from which the livers have been removed, and a conglomerate of fish for fertilizer. Such treatments are included as a part of this invention.

The apparatus includes means for transporting materials and for the continuous treatment thereof. It includes a screw conveyor, the blade of which is interrupted by means perpendicular thereto. More particularly, it includes two adjacent parallel screw conveyors with overlapping blades interrupted at intervals by means therein which is perpendicular to both screws. The invention includes also plural screw conveyors with at least one bearing located intermediate the ends thereof, and means for accelerating the rate of movement of material around the bearing. It includes special means for repeatedly reversing the movement of plural screw conveyors with overlapping blades. It includes screw conveyors of non-uniform pitch and screw conveyors with means at or near one end for breaking up agglomerates of material treated thereby. It includes reversible driving means of different types which need not necessarily be conjoined with apparatus of the type more particularly described.

The process includes the treatment of materials difficult to handle in ordinary means. It includes moving the material forward and back by screw conveyors and the transport thereof from one end to the other of a vessel with means for heating the same therein to dry and/or cook the material as it is conveyed therethrough, and the breaking up of agglomerates of the material before discharge from the vessel. The material is conveyed through the vessel with repeated compression into cakes, disintegration of the cakes, and recompression into cakes. The material is heated and at the same time a large and changing surface is exposed to gases which are passed over it to remove vapors which are evolved. The process is particularly useful in the treatment of pastes or paps, etc. of high water content, because it effects substantially uniform removal of water throughout the mass, without any portion becoming overdry. By the use of

2 proper temperatures a material may be cooked as well as dried.

Fish meat, when mashed, forms a thick paste which becomes gelatinous on heating and difficult to handle. By slowly moving the meat forward, compressing it into a cake, and then breaking up the cake, and repeating the operation at frequent intervals, and heating the meat and providing for the removal of gases and vapors as they are evolved, with possibly also the breaking up of agglomerates in the final heating step, it has been found possible to cook and dry fish meat as a continuous process; and the invention includes such treatment as will be more particularly described herein. The invention also includes the drying of brewery spent grains and distillery slops, vegetable-oil press-cake from cottonseed, soybean, etc., and other food and chemical materials, in a similar manner as will be described more particularly in what follows.

Thus, the invention not only includes new mechanical elements and movements and combinations thereof, but includes also the treatment of materials.

The invention will be described in connection with the accompanying drawings, in which—

Fig. 1 is an elevation of a single unit of equipment with parts broken away;

Fig. 2 is a plan view of the same with parts broken away;

Fig. 3 is a plan view of a section of modified equipment in which the driving shafts are supported intermediate their ends by a bearing;

Fig. 4 is a section on the line 4—4 of Fig. 3;

Fig. 5 is an elevation on the line 5—5 of Fig. 3;

Fig. 6 is a section on the line 6—6 of Fig. 1;

Fig. 7 is a section on the line 7—7 of Fig. 1;

Fig. 8 is a plan view of alternate reversible driving means connected with a plurality of treating vessels;

Fig. 9 is a sectional plan view of the driving unit of Fig. 8 on an enlarged scale;

Fig. 10 is a vertical section of the driving unit on the line 10—10 of Fig. 11;

Fig. 11 is a vertical section of the driving unit on the line 11—11 of Fig. 9;

Fig. 12 is a detail showing how the cams are movably fastened to the cam drum;

Figs. 13 and 14 illustrate how the relative positions of the cams may be changed;

Fig. 21 is a plan view, partly broken away, of a short length of equipment of modified construction which includes means at intervals for directing hot gases down into the material being treated;

Fig. 22 is a vertical section on the line 22—22 of Fig. 21;

Fig. 23 is an enlarged detail of the construction of the heating means shown in Fig. 22; and Fig. 24 is a detail on the line 24—24 of Fig. 23.

Figure 15:
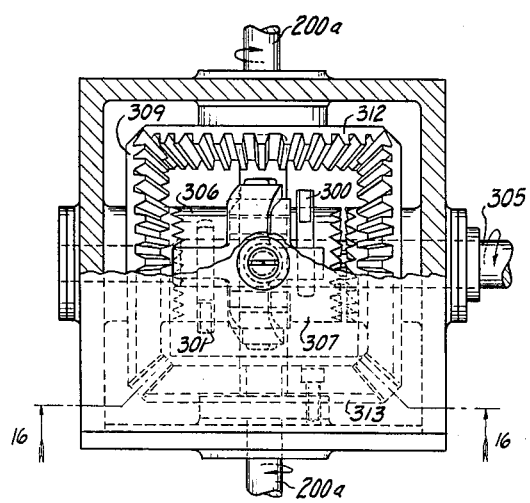
Fig. 15 is a plan view, partly broken away, of an alternative type of driving unit.

The apparatus includes the trough 1 which extends substantially throughout the entire length thereof. In cross-section, the bottom and sidewalls of the trough follow the contour of the overlapping blades with slight clearance. The trough is heated by the jacket 2. It is covered by the lid 3 which is supported at the edges by the channels 4 (Figs. 1 and 6).

The material to be treated is fed into the hopper 8 and conducted down through the passage 9 into one end of the trough, and is discharged from the trough through the spout 12 at the other end. Hot air or other gases are drawn into the vessel through the inlet 14 at one end of the trough, by the fan 15 located at the opposite end, and discharged through the opening 16. The gases and vapors are drawn from the trough up through the hood 17 and pass thence through the circular opening 18 in the partition 19, to the fan. The material is fed through the hopper at such a rate that with the aid of baffle 20 it backs up in the passage 9 sufficiently to seal this passage and prevent the fan from sucking air down through it.

Steam or other heating medium is passed through the jacket from either end to the other. It may flow in the same direction as the material in the trough or counter thereto. It is preferably introduced through the inlet 25 and exhausted through the drain and outlet 26. If high pressure steam is used it may be withdrawn intermediate the ends of the trough through the pipe 27 and passed thence through the reduction valve 28, and then reintroduced through the line 29, and finally vented through the pipe 26. In this event the jacket will be partitioned at 30.

The movement and treatment of the material is effected by the helical blades or flights 40 and 41 (which are right-hand and left-hand, respectively) fastened to the shafts 42 and 43. These shafts are rotated in opposite directions by the intermeshing gears 45 and 46. The mutilated or interrupted beveled gears 47 and 48 mounted on the shaft 49, are driven in the direction indicated by the arrow. These gears mesh with the beveled gear 50 which is mounted on the shaft 51 on which the gear 45 is mounted. As these gears are driven in the direction of the arrow they turn the beveled gear 50 first in one direction and then the other. This movement is transmitted through the gear 45 to the gear 46. These gears drive the shafts 43 and 42 through the flexible couplings 54 and 55. The gear 47 contains more teeth than the gear 48, so that as these shafts are rotated in opposite directions, first in one direction and then the other, there is an overall forward movement.

Processing of very wet materials is contemplated, such as the drying of brewers' spent grains, press-cake from a wet-process fish meal, cottonseed and soybean cake after the oil has been removed, the cooking and drying of non-oily fish after the removal of the livers, the cooking and drying of fish conglomerate for fertilizer, and for cooking and/or drying many other food and chemical products. The treatment may be complete in one stage and utilized in the treatment of products that require gentle handling, or it may be used as the final stage in the cooking or drying of material such as the final drying step for distillery slops which have previously been subjected to treatment in vacuum driers. It is particularly designed for such treatments in which the material being treated is moved slowly from one end of the treating vessel to the other. For instance, in one installation, the equipment is designed for movement of the material no faster than about .18 to .2 feet per minute. Thus, if the gear 50 contains 32 teeth, the gear 47 fourteen teeth, and the gear 48 sixteen teeth, and the shaft 49 is rotated at 10.5 revolutions per minute, if the pitch of the major portion of the flights is about 3.33 inches, a desired forward and back movement is effected with compression on first one surface of the spiral cake of the material, and then on the other with slow progression of the material from one end of the vessel to the other.

The rotation of the upper portions of the shafts toward one another is greater than the rotation in the opposite direction so that the overall effect of the movement of the flights is to cake the material around each shaft, and gradually turn these cakes up over the shafts into the middle of the trough where the material is forced to the bottom of the trough, and divided and forced into opposite directions. When the shafts reverse, the pressure is applied in the opposite direction, and a large portion of the material is forced back up to the surface at the middle of the trough between the flights. At the outer edge of the trough where the flights recede and relieve the pressure, the cake is moved slightly forward, and as the movement of the flight is reversed it strikes the inner portion of the cake, dividing or shattering it, and a large portion of the cake is compressed from the opposite direction.

The flights 40 and 41 are interrupted at intervals and the cross-shafts 60 pass through these interruptions. The manner in which these cross-shafts are mounted will be more particularly explained in connection with the description of Figs. 3 and 4. At each forward movement of the flights, the cakes are moved toward the center of the trough and over the cross-shafts 160 which break the cakes as the material is forced to the next portion of the flight. Thus, at each interruption of the flights the pressure on the material as it is moved forward is at an angle compensating that of the pitch of the blade. The material is forced down and forward at an angle approximately equal to that of the pitch of the blades 40 and 41. As the rotation of the shafts is reversed, the pressure is applied to the opposite side of the mass, i. e., from the bottom, and a large portion of the material is forced diagonally backward, thus constantly kneading or shredding the material.

This constant reversal in the direction in which the mass of material is moved, swabs the surfaces of the trough, preventing sticking. This facilitates heat transfer from the jacket to the material.

At the feed end of the trough the material is very wet, and may be too wet to cake. As it moves forward it loses water and forms spiral cakes around each screw. At first these cakes are very mushy and scarcely hold their shape. As the material progresses through the trough it loses more and more water and the cakes become more shapely. The cakes expose a large surface of the material to the action of the gases, and as these cakes are broken up in the center of the trough a larger and fresh surface is exposed. On reformation of the cakes different surfaces are exposed. The forward movement of the material through the vessel is preferably so timed that the exposure of the material on the surface of the cake is at no time sufficient to overdry it so as to make it hard and crusty. The repeated disintegration and reformation of the cakes with exposure of a constantly changing surface of the material to the gases thus effects uniform drying and the production of a dried mass of substantially uniform moisture content throughout. The final product may be more or less dry. It may even be fluffy. The temperature and time of treatment may be controlled so that the material is cooked as it is dried.

When the material fed to the equipment is of high water content, so that it tends to flow forward, the flights are advantageously placed closer together at the end of the vessel toward the hopper, to retard this forward flow. Fig. 1 illustrates the first seven turns of the flight, under the hopper, placed close togeher for this purpose. Materials of very high water content will be moved by gravity faster than those of lower water content. The pitch of the flights should be predetermined to most effectively remove the water and feed pulp in the required quantity at the point of solidification.

If material (such as fish meal, etc.) is to be cooked before it is dried, a greater space may be provided between the hopper and the exhaust fan. The baffle 20 will be placed close to the fan, and between this and the hopper the material will be maintained in a more or less fluid condition. Then, as it passes under the fan, it will start to lose its liquid content. By proper spacing, and control of the rate of rotation of the flights, etc., the cooking period can be regulated.

To more effectively expose the surface of the material to the action of the hot gases baffles 70 are provided at intervals along the top of the vessel. The bottom edge of each baffle is advantageously cut away to conform at least to some extent to the contour of the blades at the side of the trough, with sufficient cut away at the middle of the trough to prevent the baffles from interfering with the movement of the material through the trough.

On drying with the type of agitation provided by the equipment shown, fibrous material is apt to ball up and form agglomerates. Therefore, as a final step in the drying or cooking operation, the balls or agglomerates are broken down. This is done by subjecting them to the action of the closely spaced arms 80 at the discharge end of the vessel. This end of the vessel may be separated from the balance by the partition 81 (Figs. 1 and 6), although for the treatment of materials such as brewers' spent grain the partition may be found unnecessary or even undesirable. When a partition is used the agglomerates are forced through the opening 82 (Fig. 6) below the shaft 42 and through a corresponding opening below the shaft 43.

Fig. 2 shows that there is only a small clearance between the bars 80 as they pass between one another as they revolve inwardly and down, at the center of the trough. Such bars are inadequate to move any considerable amount of the material and, therefore, a blade 87 is mounted on each shaft. Its width is the same as the diameter of the screws so that it barely clears the bottom of the trough. Thus the agglomerates in the discharge end of the trough are moved by the blades 87, first to one side and then to the other as the screws oscillate back and forth. Eventually they are carried up and over the shafts, and are fed down over the intermeshing arms 80. Here they are broken up exposing fresh surfaces of the material to the action of the hot gases. Thus any moisture trapped in the agglomerates is exposed to the drying action of the hot air or gases, and the masses of fibers are broken up so that the material on discharge approaches the state of being separated into individual fibers.

The shafts 42 and 43 as shown in Figs. 1 and 2 are supported only at their ends in the bearings 90. If the shafts are so long, or the consistency of the material is such that the shafts must be supported by bearings intermediate their ends, it is desirable to provide for more rapid movement of the material in the portions of the trough in which the bearings are located, because the bearings occupy space and lessen the area through which the material may pass. These bearings advantageously comprise an upper casting 100 and a lower casting 101 which are fastened together by the bolts 102. The upper casting is fastened to the side channels 104 by the bolts 106. Flared castings 108 are bolted to the central supporting portion 109 by the bolts 110.

It is noted that the pitch of the last turn of the blades 140 and 141 on each side of the bearing is substantially twice that of the adjacent portion of the blade. This substantially doubles the speed with which the material is moved forward in this portion of the trough. The pitch should be such as to pass all the material beneath the bearing and prevent its accumulating and forming a bottleneck. The curved blades 108 tend to throw the material to the two sides and prevent its accumulating on the journals. Thus, the material is moved from one side of a bearing to the other side without interruption in its general forward flow through the trough. Interruption in the flow, as by lodgment for a period on the journals, would permit overdrying and crust formation. Continuous movement insures uniform drying.

Fig. 3 shows that each cross-bar or rod 160 is enlarged somewhat at the end 161 which is threaded. These threads mesh with the internally threaded nipples 163 located in the jacket on one side of the trough. Similar but unthreaded short nipples 164 located in the opposite side of the jacket receive the unthreaded ends of the rods 160.

Fig. 8 shows a plan view of an alternative type of driving equipment in which the drive shaft 200 drives agitators in a plurality of troughs 201 through beveled gears 203. The driving means, housed in casing 205, is located intermediate the ends of the drive shaft 200, and beveled gears on opposite sides of the driving means face each other so that the thrust imposed on the shaft on one side of the driving means is compensated by thrust on the other side. The troughs 201 are illustrated as being the same general type as illustrated in the preceding figures.

The driving mechanism includes two oppositely faced clutches 207 and 208. One or the other of these clutches is always open and the other is always closed. These clutches are slidably mounted on and driven by the drive shaft 210. The position of the yoke 211 pivotally supported on the uprights 212, determines whether clutch 207 is engaged with beveled gear 214 to turn the drive shaft 200 in one direction, or whether the clutch 208 is engaged with the beveled gear 215 to turn the drive shaft in the opposite direction. These beveled gears are journaled in bearings 216 on the frame 205.

The beveled gears 217 and 218 mesh with the gears 214 and 215 and are keyed or otherwise fastened to respective halves of the interrupted shaft 200 which terminate at these gears.

The operation of the clutch is best illustrated in Fig. 11 and the diagrams shown in Figs. 13 and 14. The unit at the top center of Fig. 11 includes the two cams 225 and 226. These operate against the pin 227 on the yoke 211, throwing it from one side to the other, so that the shaft 200 is rotated first in one direction and then in the other as first one clutch is closed, and then the other. The position of these cams determines the number of degrees which the shaft 200 turns in each direction before the direction of rotation is reversed. Figs. 13 and 14 show the cams located in different positions. In Fig. 13 the cams are located opposite one another so that the movement of the shaft 200 in one direction is just equal to its movement in the other direction. This, of course, would not be feasible for the operation of agitators in troughs such as the troughs 201 where the agitators must be moved more in one direction than the other in order to move the material from one end of the trough to the other, but is illustrative of how the cams may be set for other operations and clearly illustrates the purpose of the cams. With the cams set in the position shown in Fig. 14 the movement in one direction is much more than in the other direction. This will be further explained in connection with the cam operating mechanism. Fig. 12 shows means for mounting a cam on the drum 228 and fastening it with a bolt 229, the slot 230 in the cam permitting attachment of the cam to the drum at different positions. The bolt is tightened at any desired position in the slot to locate the cam as desired.

The drum 228 is provided with an internal gear shown in Fig. 10. It is mounted on the shaft 234. The boss 235 inside the drum 228 provides a bearing surface for rotation of the drum on the shaft. The shaft 234 is mounted in the bracket 239. The bracket 240 supports the shaft 241 to which the gears 242 and 243 are keyed. The teeth of the gear 242 mesh with the teeth of the gear surface 245 on the outer surface of the clutch member 207.

Thus, the gears 242 and 243, and the drum 228 are driven continuously in one direction by the gear surface 245 which moves with the clutch 207 which is driven by the shaft 210. The gear surface 245 is wide so that the gear 242 remains in mesh with it regardless of the position of the clutches. As the drum 228 rotates, the cams 225 and 226 operate on the pin 227, throwing the yoke 211 first in one direction, and then in the other. When the cam 225 throws the yoke to the right the clutch 208 is closed and the beveled gear 215 turns the shaft 200 in one direction. Then the cam 226 throws the yoke to the left and the gear 214 is rotated by the clutch 207, in the opposite direction. The spacing of the cams determines the number of rotations of the shaft 200 in each direction before reversal.

The ratio of the gear 243 to the gear on the inner surface of the drum 228 is 4 to 1 so that the cam drum 228 makes one revolution for each 4 revolutions of the shaft 200. If the cams 225 and 226 are placed directly opposite one another as illustrated in Fig. 13 the shaft 200 will make two rotations in one direction and then two rotations in the other. If the cams are not opposite to one another (as shown in Fig. 14) the shaft will rotate more in one direction than in the other, for instance 2½ or three turns in one direction and then 1½ or one turn in the other direction. Thus the cams may be set to move the mass of material in the agitating troughs 201 in the forward direction and then backward in any given ratio. The arrangement of the cams shown in Figs. 10 and 11 is such that in each complete cycle the material is moved forward in each of the troughs a greater distance than it is moved back.

Although the driving mechanism is shown connected intermediate the two halves of the driving shaft 200, and connected through suitable gears with agitating means in the several troughs, it is to be understood that it has many other applications. It may, for example, be mounted on the top of a vertical shaft the bottom of which is provided with agitating means for lowering into a vat, or the like. It may then be desirable to locate the cams 225 and 266 directly opposite one another so that the agitator will move first in one direction and then for an equal number of turns in the opposite direction. When used for driving a vertical agitator in this manner the cams need not be located opposite one another but may be positioned as desired.

In designing a drier for spent grains from a brewery, it has been found that no special beating arrangement is required for producing a dry, fluffy mass, and the baffle 81 and shaft with arms 80 and plate 87 may be omitted, as unnecessary. The shafts 42 and 43 with helical blades attached were made to extend from one end of the trough to the other. The heating jacket was not partitioned, as at 30, because it was found that there was no need for using steam at different pressures. A series of conveyors was arranged to be driven in pairs as illustrated in Figure 8, but with gears providing a 4 to 1 reduction between the drive and the conveyor. The ratio of the gears 228 and 243 being also four to one provides the equivalent of one complete revolution of the conveyors for each complete cycle. The arrangement of the cams shown in Fig. 10 provides for an advance of 3¾ degrees in each complete cycle. The spent grain is thus slowly moved forward with pressure of the advancing flights to cake it, and the pressure of the flights against the opposite surfaces of the caked masses as the direction of rotation of the flights was reversed, with the breaking up of the caked masses as they reach the rods 160, and also as they reach the middle of the trough, with repeated subsequent formation, while all the while heat is imparted from the jacket and heated gases are drawn through the trough to flush out the steam evolved. The spent grain is thus reduced from a wet mass of 80 per cent moisture content to a light, fibrous fluff, as it is moved through the trough at an overall rate of 3⅛ inches per hour.

Figure 18:
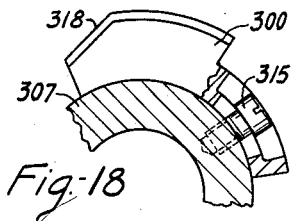
Fig. 18 is a detail showing how the cams are movably fastened to the clutches.
Figure 19:
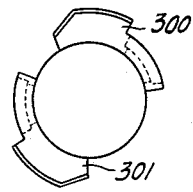
Figs. 19 and 20 illustrate how the cams may be fastened to the clutches in different relative positions.
Figure 20:
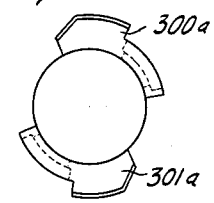
Figure 16:
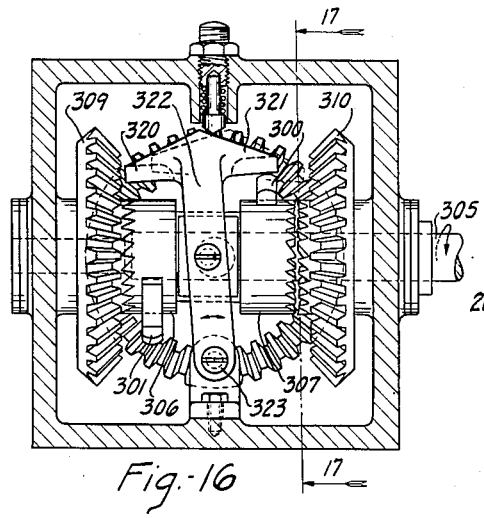
Fig. 16 is a vertical section on the line 16—16 of Fig. 15.
Figure 17:
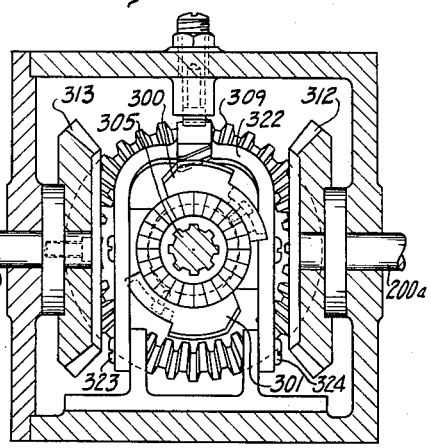
Fig. 17 is a vertical section on the line 17—17 of Fig. 16.

Figs. 15 to 20 illustrate still further means for driving a shaft first in one direction and then in the other. This may be a shaft connected with a plurality of agitators in troughs as illustrated in Fig. 8, and is so shown in Figs. 15 and 17 where the opposite halves of the shaft are designated by the reference numerals 200a. Alternatively, the driving means may be located at the top of a vertical agitator shaft. The number of rotations in each direction is controlled by adjusting the position of the cams 300 and 301, as will be explained. In Fig. 20 the cams are located in the position shown in Figs. 15 to 17. In Fig. 19 they are located in a different position, and are indicated by the reference numerals 300a and 301a.

The main drive shaft 305 is driven from an electric motor or other suitable source of power. The clutches 306 and 307 are mounted concentric with this shaft and are movable axially thereof to engage first one of the beveled gears 309 and 310, and then the other. These gears mesh with the beveled gears 312 and 313 which drive the two halves of the shaft 200a. When the drive shaft 305 is being rotated in the direction shown in the arrow, and the clutch 307 is closed, the gear 313 is rotated clockwise, and the gear 312 counterclockwise, and the shaft 200a rotates with them. Conversely, when the clutch 306 is engaged, the shaft 200a is rotated in the opposite direction.

The cam 300 is bolted to the surface of the clutch 307 by bolt 315 (Fig. 18). Cam 301 is similarly fastened to clutch 306. The sloping surfaces 318 of these cams are adapted to contact the under surfaces of the respective arms 320 and 321 which extend from opposite sides of the yoke 322. This yoke is pivoted to the frame of the driving unit at 323 and 324. As the cam 300 presses against the under side of the arm 321, it lifts it and tilts the yoke 322 to the left (Fig. 16), closing clutch 306 and thus causing the beveled gear 309 to be rotated. This, in turn, rotates the beveled gears 312 and 313 and these rotate the driving shaft 200a. On the other hand, when the cam 301 moves under the arm 320 it tilts the yoke 322 to the right, opening clutch 306 and closing clutch 307 so that the beveled gear 310 is put into motion. This similarly, through gears 312 and 313, rotates the shaft 200a in the opposite direction.

The cams 300 and 301 are located on the peripheral surfaces of the clutches 307 and 306. These clutches 306 and 307 are continuously rotating whenever the main drive shaft 305 is operating, so that the U-arm 322 is continuously thrown first in one direction and then in the other, closing first one clutch and then the other. Each cam will engage its respective arm of the yoke on each revolution of the main shaft 305, and the number of degrees that the shaft 200 rotates in each direction will depend upon the placement of the cams 300 and 301. If these cams were placed directly opposite one another the shaft 200a would turn 180° in one direction and then 180° in the reverse direction. There would then be no general movement of the contents of the different agitator troughs from the feed end to the discharge end. The movement would be equal in both directions. By proper placement of the cams the material in the troughs may be moved forward any desired proportion of the time, and backward any proportion of the time, with any overall forward movement.

The means for producing alternate rotation first in one direction and then in the other, as illustrated in the various modifications of the invention is compact and simple. There are no complicated operating parts. Any of the mechanisms shown may be used for the operation of a vertical agitator for movement first in one direction and then in the reverse direction. There are many other uses to which the illustrated driving means may be put.

Figures 21 to 24 illustrate modified treating equipment in which some or all of the cross-shafts 60 are replaced by means for directing heated gases down into the mass of the material being treated. With such equipment there is no need for baffles, such as the baffles 70, to direct down into the material the hot gases flowing over it. Instead, the hot gases are carried through the side channels 401, 402 and center channel 403 from any suitable source, and small increments are directed down into the material at frequent intervals. The source for the heated gases may be located in any convenient place, which may, for example, be at either end or at the middle of the equipment. Each channel may be progressively smaller in cross section as it leads away from the source of the hot gases to maintain the respective gases under desired pressure. The used gases may all be removed from one end of the trough by means such as illustrated in Figs. 1 and 2.

The cross channels 405 and 406 are located in interruptions in the blades 410, 411, 412 and 413. The hollows in the channels preferably extend only to a point just beyond the shafts of the respective blades, and connect with the side and center channels through small openings. Thus, the hollowed portions 415, 416 of the cross channel 406 extend from the ends of the cross channel to points which are respectively just beyond the shafts 418, 419 of the blades 412 and 413.

A small opening 420 is cut in the top center of each end of each cross bar. This connects with an opening 421 provided above each cross channel in each side channel and the center channel.

The blocks 425 are bolted to the inner wall 426 of the side channel 403 by bolts 427. Like blocks are fastened to side channel 401 and both sides of center channel 402. As best shown in Fig. 24, the sides of these blocks taper upwardly, and as shown also in Fig. 23 the top 430 slopes inwardly. This leaves the fins 431 (Fig. 24) on either side which support the cross channels.

The cross channels are held in place by the triangular clamps 435 and bolts 436. Each clamp is channeled out to provide a triangular gas passage 437 bounded on the top by the sloping wall 438, and at the sides by triangular walls 439 and 440.

The side channel 403 is illustrated as made from channel iron which forms the top, bottom and inner wall 426. The outer wall is removable. This gives easy access to the interior and permits placement of the bolts 427. The center channel may likewise be constructed with removable walls.

In assembling, the side and center channels are mounted on the tops 445 of the jacket 446. Blocks 425 may be fastened to the side and center channels before or after mounting these channels on the jacket. The cross channels 405, 406, etc. are then placed over the blocks and clamped in place by clamps 435. Any cross channel may then be easily removed for inspection or repair. The top 450 of the tank is suitably supported by the side and center channels.

The hot gases fed to the side and center channels are thus diverted at frequent intervals into the cross channels which direct them down into the material being treated and efficiently heat and dry or cook the material. The material is moved back and forth under the inflowing gases. The cakes that are formed by the backward and forward movement of the blades are disintegrated in these gases. The gases impart heat to the material which volatilizes the water in it, and they carry off the water vapor. When dried, the gases effect uniform cooking of the resultant product.

Modifications may be made without departing from the scope of the invention which is defined in the claims which follow.

What I claim is:

1. Apparatus for handling materials which includes two adjacent parallel shafts with means for rotating the shafts in opposite directions and means for periodically reversing the direction of rotation of the shafts, substantially imperforate helical blades mounted adjacent the shafts with the pitch of corresponding portions uniform and with the two blades overlapping, the blades extending from one end to the other of the respective shafts except for interruptions at the same relative positions in the respective blades, and at each interruption means perpendicular to the shafts which extends into the interrupted portion of each blade and interferes with uniform flow of material moved by the blades.

2. Means for handling material which includes a trough, two parallel shafts adjacent one another located therein, means for rotating the shafts in opposite directions with the top portions thereof turning toward one another and means for periodically reversing the direction of rotation of the shafts, a substantially imperforate helical blade attached adjacent each shaft with corresponding portions of the two blades of the same pitch, the two blades overlapping and extending from one end of the respective shafts to the other except for short interruptions opposite one another, and means located across the trough in corresponding interruptions in the respective blades whereby uniform movement of material by the blades is interrupted, there being but small clearance between the trough and the bottoms and outer edges of the respective blades.

3. Means for handling material which includes a trough, two parallel shafts adjacent one another located therein, means for rotating the shafts in opposite directions with the top portions thereof turning toward one another and means for periodically reversing the direction of rotation of the shafts, a substantially imperforate helical blade attached adjacent each shaft with corresponding portions of the two blades of the same pitch and the two blades overlapping, the blades being continuous from one end of their respective shafts to the other except for short interruptions opposite one another, and means located across the corresponding interruptions in the respective blades whereby uniform movement of material by the blades is interrupted, there being but small clearance between the trough and the bottoms and outer edges of the respective blades, the pitch of the blades being substantially uniform throughout the length thereof except that at one end of the shafts the pitch is much less than at any other place along the shafts.

4. Apparatus for heating material, which comprises a jacketed elongated vessel, two parallel shafts running substantially the length of the vessel and located relatively close to one another, a substantially imperforate helical blade on each shaft and adjacent thereto with corresponding portions of the two blades of the same pitch and the two blades overlapping, there being but small clearance between the blades and the bottom and sides of the vessel, the blades being continuous from one end of their respective shafts to the other except for short interruptions at the same position in each, means extending across the vessel perpendicular to the shafts and located just above the shafts in each of said interruptions in the blades to interfere with uniform movement of the material with the blades, and means for rotating the shafts in opposite directions to move the upper portions of the blades toward one another and means for periodically reversing the direction of rotation of the shafts, and means for introducing gases at one end of the vessel and removing them from the other.

5. Apparatus for heating material which comprises a jacketed elongated vessel, two parallel shafts extending substantially the length of the vessel and located relatively close to one another therein, a substantially imperforate helical blade on each shaft and adjacent thereto with corresponding portions of the two blades of the same pitch and the two blades overlapping, there being but small clearance between the blades and the bottom and sides of the vessel, means for rotating the shafts in opposite directions first in one direction and then in the reverse direction, but with a larger number of rotations of the shafts in one direction than in the reverse direction, so as to provide a general movement of the contents of the vessel from one end thereof to the other, the blades being continuous from one end of their respective shafts to the other except for short interruptions at the same position in each, means extending across the vessel perpendicular to the shafts and located above the shafts in each of said interruptions in the blades to interfere with uniform movement of the material with the blades, means for feeding material to one end of the vessel and removing it from the other end, and means for introducing gases to the vessel at the latter end and removing them from the former to flush out vapors evolved in the treatment of material therein.

6. Apparatus for handling materials which comprises a trough, two shafts extending substantially the length of the trough with a substantially imperforate helical blade attached adjacent each shaft, corresponding portions of the blades being of the same pitch, with the blades overlapping, there being but slight clearance between the blades and the bottom and sides of the trough, and at one end of the shafts beyond the blades arms fixed to the respective shafts and extending outwardly with the arms fixed to the respective shafts being staggered with respect to one another and with but slight clearance between arms fixed to one shaft and those fixed to the other shaft as the shafts rotate in opposite directions, and means for feeding material from the bottom of the trough on to the arms.

7. An elongated vessel, means for feeding bulk material to the vessel and discharging material therefrom, means for introducing gases to the vessel and venting gases therefrom, means for moving the material from one end of the vessel to the other and including means to form the material into small bulks of material and for periodically reversing the direction of movement of said moving means whereby pressure is applied periodically to opposite sides of said bulks of material to repeatedly press the material into cakes, and means within said vessel for disintegrating the cakes.

8. Apparatus for treating materials which includes a trough, parallel shafts therein with intermeshing blades attached to the respective shafts, narrow interruptions at the same location in each blade, and in each such pair of interruptions means extending across the trough and spaced from the top and bottom thereof and adapted to convey gases down into the material being treated.

9. Apparatus for handling materials which includes a trough, two shafts therein adjacent one another located lengthwise of the trough, means for rotating the shafts in opposite directions and means for periodically reversing the direction of rotation of the shafts, a helical blade around each shaft and adapted to rotate therewith, an interruption at the same relative position in the respective blades, at least one complete encirclement of each shaft by its blade at each side of the interruption, and at the interruption means located across the trough in the path of both blades which interferes with uniform flow of material moved by the blades.

10. An elongated vessel, means at one end thereof for feeding bulk material to the vessel and means for removing it from the other end thereof, means at different positions along the length of the vessel for moving the material from one end of the vessel to the other and for segregating the material into small bulks and applying pressure to said small bulks of the material to compress the material into cakes in its passage through the vessel and means for periodically reversing the direction of movement of said moving means whereby the material is moved backwardly a portion of the distance it is moved from said one end to the other, and means between said segregating and pressing means for disintegrating the cakes as the material is moved therebetween.

11. Apparatus for treating material, which comprises an elongated vessel, two parallel shafts running substantially the length of the vessel and located relatively close to one another, a substantially imperforate helical blade on each shaft and adjacent thereto with corresponding portions of the two blades of the same pitch and the two blades overlapping, there being but small clearance between the blades and the bottom and sides of the vessel, the blades being continuous from one end of their respective shafts to the other except for short interruptions at the same position in each, means extending across the vessel in each of said interruptions in the blades to interfere with uniform movement of the material with the blades, means for rotating the shafts in opposite directions to move the upper portions of the blades toward one another and means for periodically reversing the direction of rotation of the shafts, and means for introducing gases at one end of the vessel and removing them from the other.

MELVIN J. NAPIER.

References Cited in the file of this patent

UNITED STATES PATENTS

| Number | Name | Date |
| --- | --- | --- |
| 409,409 | Langer | Aug. 20, 1889 |
| 501,048 | Bassett | July 11, 1893 |
| 640,628 | Bussells | Jan. 2, 1900 |
| 676,165 | Wacker | June 11, 1901 |
| 761,571 | Anderson et al. | May 31, 1904 |
| 799,939 | Reynolds et al. | Sept. 19, 1905 |
| 940,193 | Rickey | Nov. 16, 1909 |
| 1,099,956 | Williams | June 16, 1914 |
| 1,579,970 | Tharaldsen | Apr. 6, 1926 |
| 1,989,751 | Hagler et al. | Feb. 5, 1935 |
| 2,005,082 | Greenawalt | June 18, 1935 |
| 2,059,435 | Brownlee | Nov. 3, 1936 |
| 2,067,506 | Silva | Jan. 12, 1937 |
| 2,102,607 | Baker | Dec. 21, 1937 |
| 2,128,715 | Reich | Aug. 30, 1938 |
| 2,259,210 | Modave | Oct. 14, 1941 |
| 2,277,361 | Bonotto | Mar. 24, 1942 |
| 2,348,560 | Morrow | May 9, 1944 |
| 2,452,249 | Leiske | Oct. 26, 1948 |
| 2,452,983 | Birdseye | Nov. 2, 1948 |
| 2,458,068 | Fuller | Jan. 4, 1949 |
| 2,475,225 | Dulaney | July 5, 1949 |
| 2,478,889 | Harris | Aug. 16, 1949 |
| 2,554,082 | Anderson | May 22, 1951 |